United States Patent
Pynnönen et al.

(10) Patent No.: US 10,604,656 B2
(45) Date of Patent: Mar. 31, 2020

(54) COMPOSITE

(75) Inventors: Janne Pynnönen, Espoo (FI); Matti Myyryläinen, Lapeenranta (FI); Duncan Mayes, Helsinki (FI); Jouko Silen, Riihimäki (FI)

(73) Assignee: STORA ENSO OYJ, Helsinki (FI)

( * ) Notice: Subject to any disclaimer, the term of this patent is extended or adjusted under 35 U.S.C. 154(b) by 1185 days.

(21) Appl. No.: 13/825,222

(22) PCT Filed: Sep. 19, 2011

(86) PCT No.: PCT/FI2011/050802
§ 371 (c)(1),
(2), (4) Date: Jul. 2, 2013

(87) PCT Pub. No.: WO2012/038594
PCT Pub. Date: Mar. 29, 2012

(65) Prior Publication Data
US 2013/0291763 A1    Nov. 7, 2013

(30) Foreign Application Priority Data
Sep. 21, 2010    (FI) ..................... 20105968

(51) Int. Cl.
C08L 97/02 (2006.01)
B27N 3/28 (2006.01)
B27N 3/00 (2006.01)

(52) U.S. Cl.
CPC .............. *C08L 97/02* (2013.01); *B27N 3/007* (2013.01); *B27N 3/28* (2013.01)

(58) Field of Classification Search
CPC ............ C08L 97/02; B27N 3/007; B27N 3/28
See application file for complete search history.

(56) References Cited

U.S. PATENT DOCUMENTS

| | | | |
|---|---|---|---|
| 5,017,319 A | 5/1991 | Shen | |
| 5,413,746 A | 5/1995 | Birjukov | |
| 5,770,137 A | 6/1998 | Lörcks et al. | |
| 5,939,192 A | 8/1999 | Rettenbacher et al. | |
| 2003/0036589 A1* | 2/2003 | Archuletta | C08L 97/02 524/13 |
| 2004/0076820 A1* | 4/2004 | Hodgson | B27N 1/00 428/326 |
| 2006/0258783 A1 | 11/2006 | Rettenbacher | |
| 2009/0181061 A1* | 7/2009 | Granlund | A01N 59/16 424/405 |

FOREIGN PATENT DOCUMENTS

| | | |
|---|---|---|
| CN | 1116416 A | 2/1996 |
| CN | 1131957 A | 9/1996 |
| CN | 1933947 A | 3/2007 |
| CN | 101077916 A | 11/2007 |
| DE | 21 03 685 A1 | 8/1972 |
| EP | 0 161 766 A1 | 11/1985 |
| EP | 0 161 766 B1 | 11/1985 |
| EP | 0882756 A2 | 12/1998 |
| GB | 1 434 983 A | 5/1976 |
| GB | 1 446 716 A | 8/1976 |
| GB | 2 028 841 A | 3/1980 |
| JP | S49-076973 | 7/1974 |
| JP | H08 510416 A | 11/1996 |
| JP | 09-085716 | 3/1997 |
| JP | 2001205751 A | 7/2001 |
| JP | 2002144399 A | 5/2002 |
| JP | 2003231107 A | 6/2003 |
| JP | 2005144744 A | 6/2005 |
| JP | 2009066920 A | 4/2009 |
| RU | 2 075 384 C1 | 3/1997 |
| RU | 2 245 783 C1 | 2/2005 |

OTHER PUBLICATIONS

Japanese Office Action (English and Japanese language) for Japanese Application No. 2013-529688 dated Jun. 25, 2015, 7 pages.
Russian and English language Russian Office Action for Russian Patent Application No. 2013115347 dated Sep. 9, 2015, 10 pages.
Chinese Office Action for China Patent Application No. 201180045187.1 dated May 22, 2015, 6 pages.

* cited by examiner

*Primary Examiner* — Samir Shah
(74) *Attorney, Agent, or Firm* — Patterson Thuente Pedersen, P.A.

(57) ABSTRACT

The invention concerns an extruded composite containing wood fibre material and polymer. The wood fibre material is wood material where the knot or branch content is at least 10 w-%, or bark, or would material into which extract material obtained by extracting knots, branches or bark has been absorbed. The amount of the polymer is 5-25% from the weight of the composite. The composite has high hardness, and reduced moisture absorption and swelling properties. It can be used as constructional material.

7 Claims, No Drawings

COMPOSITE

PRIORITY CLAIM

The present application is a National Phase entry of PCT Application No. PCT/FI2011/050802, filed Sep. 19, 2011, which claims priority from FI Application No. 20105968, filed Sep. 21, 2010, the disclosures of which are hereby incorporated by reference in their entireties.

FIELD OF THE INVENTION

The present invention relates to materials technology and concerns an extruded composite containing wood fibre and polymers. The material can be used in a range of end use applications with a special focus on decorative and constructional end uses.

BACKGROUND OF THE INVENTION

Different kinds of extruded composites containing wood fibre and polymers are known. These composites can be used especially as constructing materials. CN 101077916 A describes one such material. It consists of 29-70 w-% of plastic, 28-69 w-% of wood fibre, 1-2 w-% of cross-linking agent, and 1-2 w-% of coupling agent. The plastic may be polyethylene, non-toxic polyvinyl chloride, or polypropylene. The wood fibre may be plant root, branch, leaf, bark, peanut shell, wheat straw, or sawdust.

SUMMARY OF THE INVENTION

The present invention is directed at a composite, method for the preparation of a composite, and use of a composite.

The composite contains wood fibre material and polymer, and it has been prepared by extrusion. The wood fibre material is wood material of which the knot or branch content is at least 10 w-%, or bark, or wood material into which extract material obtained by extracting knots, branches or bark has been absorbed. The amount of polymer is 5-25% from the weight of the composite.

In some aspects, the composite contains wood fibre material that comprises heartwood material the knot or branch content of which is at least 20 w-%, or birch bark. In some aspects, the heartwood material is pine material.

In some aspects, the polymer is polyalkylene or biopolymer.

The composite has advantageous properties, especially high hardness, scratch resistance, bending strength, modulus of elasticity, reduced moisture uptake, and improved biological resistance.

The composite may be especially in a board form and used as a construction or furniture material. In some aspects, the composite is used as a construction, decorative, packaging, transport or furniture material.

In some aspects, the composite is prepared by a method in which method wood fibre material and polymer are mixed and extruded to a solid composite, characterized in that the wood fibre material is wood material where the knot or branch content is at least 10 w-%, or bark, or wood material into which extract material obtained by extracting knots, branches or bark has been absorbed, and that the amount of the polymer is 5-25% from the weight of the composite.

DETAILED DESCRIPTION OF THE FIGURES

The composite in accordance with the present invention is extruded from a mixture of specially selected wood fibre material and polymers. The wood fibre material may be wood material where the knot or branch content is at least 10 w-%, preferably at least 15 w-%, most preferably at least 25 w-%. The wood material is preferably heartwood material. It is preferably also pine material. Alternatively, the wood fibre material may be bark. Alternatively, the wood material may also be such as into which extract material obtained by extracting knots, branches or bark has been absorbed. The new composite has significantly increased levels of surface hardness, scratch resistance and strength properties, lower hygroscopicity leading to improved dimensional stability. It also has improved biological resistance (especially against fungi and insects). This effect is especially significant, when pine heartwood is used. It is also claimed that the material may contain antibacterial properties due to the concentration of natural extractives in the wood fibre which prevent growth of bacteria such as *E. coli*.

Bark is readily obtained as a cheap by-product from wood industry. Also the heartwood and knotty material are already separated from other wood material in some processes e.g. in mechanical wood industry. In this invention X-ray technology is used to select out material with high heartwood content and knotty material which can then be converted into wood fibre suitable for the extrusion process.

The composite may be extruded e.g. into board form and used as a construction, decorative, packaging, transport or furniture material. The boards may used e.g. as wall and ceiling materials especially in places where high hardness and scratch resistance are advantages. Such places are e.g. schools, hospitals, offices, and industrial buildings. The composite could be used also e.g. in concrete form work. Possible surface damages can be easily repaired. They can be e.g. filled, machined and painted.

The composite may also be combined with another material, e.g. with solid wood. It may form an extruded coating on the other material.

The surface of the composite may be smooth or textured. The surfaces of the board composite may also be profiled into different shapes, e.g. corrugated.

Used composite may be e.g. recycled, burned, or put into normal wasting handling systems.

The amount of the wood fibre is preferably 60-90 w-%, most preferably 70-85 w-%. The fibre may be obtained especially from softwood, especially from pine. The particle size of said fibre material is preferably at most 5 mm, more preferably 0.5-3 mm, and most preferably 1-3 mm.

In addition to the wood fibre material, the mixture thus contains polymer. The amount of the polymer is 5-25 w-%, preferably 10-17 w-%. The polymer is preferably thermoplastic, but it may also be thermosetting. Suitable polymers are, e.g., polyalkylenes, such as polypropylene or polyethylene, and suitable biopolymers, such as starch or polylactic acid.

The composite may contain also suitable additives, such as coupling agents enhancing the connection between the fibres and the polymer, lubricants, fillers, colours, fire resistant compounds, or UV-resistance compounds. E.g., fibre glass, talc, calcium carbonate, zinc borate, or melamine may be used as fillers. The amount of the filler is at most 50 w-%, preferably at most 30 w-%, more preferably at most 20 w-%. The wood material may be pre-modified with suitable additives before extrusion.

The composite may be prepared so that said wood material is ground to the desired particle size, mixed with the polymer particles and possible additives, and extruded in a temperature in which the polymer melts. Suitable temperature may be e.g. 120-190° C. Before the extrusion, the mixture is preferably granulated. Alternatively, knot, branch or bark extract is absorbed into desired wood material and thus obtained wood material is used in preparing the extrusion mixture.

EXAMPLES

Wood fibre material was ground in a hammer mill to small particles (0-5 mm) The ground wood fibre material was dry blended with polymer and coupling agent, with the option of including lubricant and filler. The blend was processed with direct extrusion using a twin screw extruder. After feeding into hopper, the blend was melted and further mixed in extruder by using temperatures ranging from 170° C. to 190° C. Process pressures varied between 50 bar and 100 bar depending on the screw rate and used materials. Finally materials were extruded through the die to a plate profile 20×125 mm and cooled in a cooling bath. Samples for different tests were cut from the composite profiles.
The following wood fibre materials were used:
- standard ungraded spruce fibre as reference material, the knot content of which was standard spruce content (about 1-4 w %)
- knotty pine heartwood, the knot content of which was over 10 w-%
- birch bark
- pine bark.

The following polymers were used:
- polypropylene (PP) (by Ineos)
- polylactic acid (PLA) (by Natureworks)
- starch (MO 1021 HP by Biopolymer technologies).

The following fillers were used:
- fibre glass
- talc
- calcium carbonate
- zinc borate
- melamine MeI F40 (by Ecochem)
- aluminium trihydrate (ATH).

Maleic anhydiride crafted polypropyle (MAPP) was used as the coupling agent and Struktol TPW 113 (by Struktol) as the lubricant.

Basically 170° C. was used with materials containing polypropylene (PP) or starch and 190° C. for materials containing polylactic acid (PLA).

Example Composites

The following example recipes given in Table 1 were prepared:

TABLE 1

| Example no. | Polymer | Fibre | Coupling agent | Filler | Lubricant |
|---|---|---|---|---|---|
| 1 | PP 25% | Pine Heartwood, knot content >30 w-%, 72% | MAPP 3% | | 0% |
| 2 | PP 17% | Pine Heartwood, knot content >10 w-%, 78.5% | MAPP 3% | | 1.5% |
| 3 | PP 17% | Birch bark 77% | MAPP 3% | | 3% |
| 4 | PP 17% | Pine bark 77% | MAPP 3% | | 3% |
| 5 | PP 17% | Spruce bark 77% | MAPP 3% | | 3% |
| 6 | PP 17% | Pine Heartwood, knot content 30 w-%, 77% | MAPP 3% | ATH 20% | 2.2% |
| 7 | PP 17% | Pine Heartwood, knot content 70 w-%, 57.8% | MAPP 3% | | 3% |
| 8 (ref.) | PP 17% | Spruce 77% | MAPP 3% | | 3% |
| 9 (ref.) | PP 22% | Spruce 70% | MAPP 3% | Fibre glass 5% | |
| 10 (ref.)2 | PLA 20% | Spruce 74% | MAPP 3% | | 3% |
| 11 (ref.) | PP 17% | Spruce 58.5% | MAPP 3% | Talc 20% | 1.5% |
| 12 (ref.) | PP 17% | Spruce 57% | MAPP 3% | Calcium carbonate 20% | 3% |
| 13 (ref.) | PP 17% | Spruce 57% | MAPP 3% | Zinc borate | 3% |
| 14 (ref.) | PP 17% | Spruce 57% | MAPP 3% | Melamine 20% | 3% |
| 15 (ref.) | Starch 17% | Spruce 77% | MAPP 3% | | 3% |

Mechanical Tests

The following tests were made: Modulus of rupture (MOR) & Modulus of elasticity (MOE) using EN 310, Brinell hardness (EN 1534), scratching resistance (SS 839122). Results are shown in Table 2.

TABLE 2

| Ex. no | Bending strength/ MPa | Modulus of elasticity/ GPa | Brinell hardness | Scratching resistance/xN/ 0.5 mm scratch |
|---|---|---|---|---|
| 1 | 26 | 3.7 | 22.2 | 30 |
| 2 | 15 | 2.6 | 6.0 | 15 |
| 3 | 12 | 1.7 | 5.5 | 15 |
| 4 | 6 | 2.0 | 3.9 | 15 |
| 5 | 11 | 2.5 | 7.1 | 20 |
| 8 (ref.) | 14 | 2.9 | 5.3 | 20 |
| 9 (ref.) | | | | 30 |
| 10 (ref.) | 10 | 2.8 | 3.4 | 20 |
| 11 (ref.) | 24 | 5.8 | 13.2 | 20 |
| 12 (ref.) | 18 | 3.7 | 10.0 | 30 |
| 13 (ref.) | 20 | 4.3 | 9.2 | 20 |
| 14 (ref.) | 21 | 4.1 | 10.6 | |

Water Absorbtion

Water absorption test were made. Results are shown in Table 3.

TABLE 3

| Ex. no. | Water absorbtion after 1 day/% | Water absorbtion after 7 days/% | Water absorbtion after 14 days/% | Water absorbtion after 28 days/% |
|---|---|---|---|---|
| 1 | 13 | 28 | 31 | 32 |
| 2 | 2 | 9 | 14 | 18 |
| 3 | 7 | 21 | 28 | 30 |
| 4 | 4 | 11 | 18 | 23 |
| 5 | 11 | 11 | 18 | 19 |
| 8 (ref.) | 7 | 22 | 30 | 32 |
| 9 (ref.) | 9 | 31 | 42 | 46 |
| 10 (ref.)2 | 2 | 9 | 13 | 18 |
| 11 (ref.) | 5 | 12 | 18 | 22 |

TABLE 3-continued

| Ex. no. | Water absorbtion after 1 day/% | Water absorbtion after 7 days/% | Water absorbtion after 14 days/% | Water absorbtion after 28 days/% |
|---|---|---|---|---|
| 12 (ref.) | 3 | 12 | 18 | 22 |
| 13 (ref.) | 10 | 27 | 30 | 31 |
| 14 (ref.) | 6 | 25 | 31 | 36 |

Swelling

Thickness swelling tests were made (EN 317). Results are shown in Table 4.

TABLE 4

| Ex. no. | Thickness swelling after 1 day/% | Thickness swelling after 7 days/% | Thickness swelling after 14 days/% | Thickness swelling after 28 day/% |
|---|---|---|---|---|
| 1 | 5 | 9 | 9 | 9 |
| 2 | 1 | 2 | 4 | 5 |
| 3 | 2 | 7 | 8 | 8 |
| 4 | 2 | 6 | 9 | 10 |
| 5 | 1 | 5 | 7 | 7 |
| 8 (ref.) | 3 | 9 | 10 | 10 |
| 9 (ref.) | 4 | 13 | 14 | 15 |
| 10 (ref.)2 | 2 | 9 | 10 | 11 |
| 11 (ref.) | 2 | 5 | 9 | 10 |
| 12 (ref.) | 3 | 7 | 9 | 9 |
| 13 (ref.) | 4 | 12 | 13 | 13 |
| 14 (ref.) | 3 | 10 | 13 | 14 |

Surface Resistance to Liquids

Surface resistance to cold liquids was tested according to ISO 4211 (1979).

Test Liquids and Periods were:
- water 24 hours
- paraffin oil 24 hours
- coffee 16 hours
- ethanol 48% 16 hours
- red wine 6 hours
- acetone 2 minutes Assessment of Results:

5 No visible changes (no damage)

4 Slight change in luster, visible only when the light source is mirrored in the test surface on or quite near the mark and is reflected towards the observer's eye, or a few isolated marks just visible 3 Slight mark, visible in several viewing directions, for example almost complete disc or circle just visible 2 Strong mark, the structure of the surface being however largely unchanged 1 Strong mark, the structure of the surface being changed or the surface material being wholly or partially removed or the filter paper adhering to the surface The results are shown in Table 5.

TABLE 5

| Test liquid | Test sample | | | | | | |
|---|---|---|---|---|---|---|---|
| | 1 | 2 | 6 | 7 | 8 (ref.) | 11 (ref.) | 14 (ref.) |
| Water | 3 | 3 | 1 | 1 | 3 | 2 | 2 |
| Paraffin oil | 2 | 2 | 3 | 2 | 2 | 3 | 3 |
| Coffee | 4 | 4 | 4 | 3 | 4 | 3 | 4 |
| Ethanol | 3 | 3 | 1 | 1 | 3 | 2 | 2 |
| Red wine | 4 | 4 | 4 | 3 | 4 | 3 | 3 |
| Acetone | 5 | 5 | 5 | 5 | 5 | 5 | 5 |

Analysis of Extractives

Reject wood from 50×100 mm pine lumber ranging in length from a few centimetres' to up to 20 cm in length was used. Every single piece contained one or more clearly visible piece of knotwood.

23 kg of wood was cut into roughly 3 cm thick slices. These were then chipped into chips of sufficient size to both separate the knotwood and conveniently fit in a laboratory grinder. A sample for extractions was taken from this material. This was done by first placing all chipped material in a pile. Then small samples were taken dividing the pile in two equally sized piles. This procedure was repeated until a sample of roughly 1.4 kg was attained. The sample was the ground to pass a 2 mm sieve.

229.3 g of ground wood was extracted with hexane for 24 h using a 1 L extractor and 2 L of solvent. The hexane extracted wood was then further extracted with acetone containing 5% water. The Soxhlet extractor and all its parts had prior to the analysis been cleaned by washing with alkaline water, distilled water, technical grade acetone and finally by cycling the extractor 20 times with acetone.

The solutions were evaporated at 40° C. using a rotary evaporator. Gravimetric yield was determined A sample of the dry extracts was transferred to a 12 ml test tube and dissolved in acetone. An aliquot corresponding to 0.5 mg was transferred to another test tube. 2 ml of a standard solution was added. The solvent was evaporated by a stream of $N_2$-gas. In addition, the samples were placed in a vacuum oven at 40° C. for 15 min. The samples were then analyzed by GC. Quantification was done against internal standards.

The extractives were analyzed by GC both on a short and long column and key components were quantified. The unidentified components are primarily minor fatty acids, oxydized resins acids, steryl esters and oligomeric lignan compounds.

The tabulated extractives are typical of pine heartwood and knotwood. However, the gravimetric amount of extractives is roughly double that of heartwood, and the extractives contain significantly more lignans and stilbenes.

An estimate of the amount of knotwood was made based on the content of stilbenes and lignans as well as manually sorting wood particles from knots. The smallest estimate, based on extractives composition and yield, arrives at 21% knotwood content. The highest estimate, based on manual sorting of chips, suggest a knotwood content of 25%.

The results are shown in Tables 6 and 7.

TABLE 6

| Hexane extractives | |
|---|---|
| | [of extract] |
| Fatty acids | |
| 16:0 | 0.3% |
| 17:0 ai | 0.8% |
| 18:3 | 0.8% |
| 18:2 | 2.5% |
| 18:1 | 1.7% |

TABLE 6-continued

| Hexane extractives | |
|---|---|
| | [of extract] |
| 20:0 | 0.3% |
| 22:0 | 0.2% |
| Resin acids | 6.6% |
| Pimaric acid | 6.6% |
| Sandaracopimaric acid | 1.1% |
| Isopimaric acid | 3.7% |
| Palustric acid | 11.4% |
| Levopimaric acid | 1.7% |
| Dehydroabietic acid | 6.8% |
| Abietic acid | 24.1% |
| Neoabietic | 10.4% |
| Stilbenes | 65.7% |
| Pinosylvin mono methyl ether | 4.7% |
| Unidentified/unquantified | 23.0% |
| Gravimetric yield | 7.5% |

TABLE 7

| Acetone extractives | |
|---|---|
| | [of extract] |
| Fatty acids | |
| 16:0 | 0.2% |
| 17:0 ai | 0.1% |
| 18:3 | 0.3% |
| 18:2 | 0.6% |
| 18:1 | 0.4% |
| 20:0 | 0.2% |
| 22:0 | 0.2% |
| Resin acids | 1.9% |
| Pimaric acid | 1.1% |
| Sandaracopimaric acid | 0.2% |
| Isopimaric acid | 0.6% |
| Palustric acid | 0.0% |
| Levopimaric acid | 0.0% |
| Dehydroabietic acid | 1.5% |
| Abietic acid | 3.5% |
| Neoabietic acid | 1.0% |
| Stilbenes | 7.8% |
| Pinosylvin monomethyl ether | 19.1% |
| Pinosylvin | 7.5% |
| Lignans | 26.6% |
| Nortrachelogenin | 6.1% |
| Matairesinol | 1.2% |
| Other | 7.2% |
| Glucose? | 7.1% |
| Unidentified/unquantified | 49.4% |
| Gravimetric yield | 3.1% |

The invention claimed is:

1. An extruded composite comprising:
   a wood fibre material in an amount of 60 to 90 weight % of the extruded composite, wherein the wood fibre material is a pine heartwood material having a knot content between at least about 20 weight % and up to about 78.5 weight %;
   a polymer in an amount of at least 5 weight % and up to 25 weight % of the extruded composite;
   an optional coupling agent comprising maleic anhydride grafted polypropylene; and
   an optional lubricant;
   wherein the extruded composite is substantially devoid of a filler material comprising fibre glass, talc, calcium carbonate, zinc borate, melamine, and aluminium trihydrate.

2. The extruded composite of claim 1, wherein the polymer is polyalkylene or biopolymer.

3. The extruded composite of claim 2, wherein the polymer is polyalkylene chosen from polypropylene or polyethylene.

4. The extruded composite of claim 2, wherein the polymer is biopolymer chosen from starch or polylactic acid.

5. The extruded composite of claim 1, wherein the amount of polymer is between about 10 weight % and about 17 weight % of the extruded composite.

6. The extruded composite of claim 5, wherein the polymer is polypropylene or polyethylene.

7. The extruded composite of claim 1, wherein the extruded composite is used in a manufactured material chosen from a construction material, a decorative material, a packaging material, a transport material or a furniture material.

* * * * *